United States Patent
Hosoda

(10) Patent No.: US 9,166,968 B2
(45) Date of Patent: Oct. 20, 2015

(54) INFORMATION PROCESSING APPARATUS, CONTROL METHOD THEREOF, STORAGE MEDIUM, AND IMAGE PROCESSING APPARATUS

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/889,705

(22) Filed: May 8, 2013

(65) Prior Publication Data

US 2013/0318585 A1    Nov. 28, 2013

(30) Foreign Application Priority Data

May 22, 2012    (JP) .................................. 2012-116915

(51) Int. Cl.
*H04L 29/06* (2006.01)
*G06F 21/33* (2013.01)
*G06F 21/41* (2013.01)

(52) U.S. Cl.
CPC .......... *H04L 63/0815* (2013.01); *G06F 21/335* (2013.01); *G06F 21/41* (2013.01)

(58) Field of Classification Search
CPC .... G06F 21/335; G06F 21/41; H04L 63/0815
USPC .............................. 726/7, 8, 10, 27
See application file for complete search history.

(56) References Cited

U.S. PATENT DOCUMENTS

| | | | |
|---|---|---|---|
| 6,178,511 B1 * | 1/2001 | Cohen et al. ........................ 726/6 |
| 6,263,432 B1 * | 7/2001 | Sasmazel et al. ............. 713/100 |
| 6,678,731 B1 * | 1/2004 | Howard et al. ............... 709/225 |
| 7,412,720 B1 * | 8/2008 | Frey et al. ........................... 726/8 |
| 8,141,139 B2 * | 3/2012 | Hinton et al. ...................... 726/8 |
| 8,281,378 B2 * | 10/2012 | Anderson .......................... 726/8 |

(Continued)

FOREIGN PATENT DOCUMENTS

| CN | 102609635 A | 7/2012 |
|---|---|---|
| EP | 2442252 A1 | 4/2012 |

(Continued)

OTHER PUBLICATIONS

Chinese Office Action issued in corresponding Chinese Application No. 201310187432.3 dated Aug. 20, 2015.

*Primary Examiner* — David Garcia Cervetti

(74) *Attorney, Agent, or Firm* — Fitzpatrick, Cella, Harper & Scinto

(57) ABSTRACT

A user credential sharing mechanism which can suitably implement a single sign-on function while preventing illicit accesses by accidental matches of authentication data in a mixed environment of an environment suitable for use of a single sign-on function and an unsuitable environment is provided. To accomplish this, when an information processing apparatus of this invention receives, from a user, an access request instruction to an external apparatus connected to be able to communicate with the information processing apparatus, if an authentication protocol related to user credentials generated at the time of a login operation is that which can limit a security domain, the apparatus accesses the external apparatus using the user credentials, and if that authentication protocol is that which cannot limit a security domain, the apparatus prompts the user to input an account accessible to the external apparatus.

15 Claims, 13 Drawing Sheets

TABLE a

| | 1201 | 1202 | 1203 | 1204 | 1205 | 1206 | 1207 | |
|---|---|---|---|---|---|---|---|---|
| | LOGIN ACCOUNT | | | CONNECTION DESTINATION | | | PERMISSION/ INHIBITION OF SINGLE SIGN-ON | |
| | USER REPOSITORY | USER CREDENTIAL | | FILE SHARING SERVER | USER REPOSITORY | AUTHENTICATION PROTOCOL | LAN | |
| | 102 | Local | Plain Text | 110 | 109 | SMB Kerberos | 103 | × | ~1208 |
| | 102 | Local | Plain Text | 111 | 114 | SMB NTLM | 104 | □ | ~1209 |
| | 109 | Domain | Kerberos TGT | 110 | 109 | SMB Kerberos | 103 | ○ | ~1210 |
| | 109 | Domain | Kerberos TGT | 111 | 112 | SMB NTLM | 104 | × | ~1211 |

(56) References Cited

U.S. PATENT DOCUMENTS

| | | | |
|---|---|---|---|
| 8,613,067 B2* | 12/2013 | Lambiase et al. | 726/8 |
| 9,019,071 B1* | 4/2015 | Mallard | 340/5.6 |
| 2003/0005178 A1* | 1/2003 | Hemsath | 709/328 |
| 2004/0059685 A1* | 3/2004 | Sakamura et al. | 705/65 |
| 2005/0039008 A1* | 2/2005 | Bhatia et al. | 713/170 |
| 2005/0074126 A1* | 4/2005 | Stanko | 380/279 |
| 2005/0210251 A1* | 9/2005 | Nyberg et al. | 713/169 |
| 2006/0015358 A1* | 1/2006 | Chua | 705/1 |
| 2006/0031683 A1* | 2/2006 | Marion et al. | 713/185 |
| 2006/0064753 A1 | 3/2006 | Otake et al. | |
| 2006/0230438 A1* | 10/2006 | Shappir et al. | 726/8 |
| 2007/0006291 A1* | 1/2007 | Barari et al. | 726/10 |
| 2007/0016943 A1* | 1/2007 | M'Raihi et al. | 726/9 |
| 2007/0079136 A1* | 4/2007 | Vishik et al. | 713/186 |
| 2007/0101418 A1 | 5/2007 | Wood et al. | |
| 2007/0103712 A1 | 5/2007 | Corona | |
| 2007/0118734 A1* | 5/2007 | Oseto et al. | 713/155 |
| 2007/0124490 A1* | 5/2007 | Kalavade et al. | 709/230 |
| 2007/0150603 A1* | 6/2007 | Crull et al. | 709/227 |
| 2007/0169171 A1* | 7/2007 | Kumar et al. | 726/2 |
| 2007/0226785 A1* | 9/2007 | Chow et al. | 726/8 |
| 2007/0234408 A1* | 10/2007 | Burch et al. | 726/6 |
| 2008/0086764 A1* | 4/2008 | Kulkarni et al. | 726/7 |
| 2008/0086767 A1* | 4/2008 | Kulkarni et al. | 726/9 |
| 2008/0086770 A1* | 4/2008 | Kulkarni et al. | 726/20 |
| 2008/0109371 A1* | 5/2008 | Sakamura et al. | 705/67 |
| 2008/0134305 A1* | 6/2008 | Hinton et al. | 726/5 |
| 2008/0155669 A1* | 6/2008 | Harik et al. | 726/6 |
| 2008/0175393 A1* | 7/2008 | Oba et al. | 380/279 |
| 2008/0178277 A1* | 7/2008 | Oba et al. | 726/10 |
| 2008/0196090 A1 | 8/2008 | Baron et al. | |
| 2008/0212783 A1* | 9/2008 | Oba | 380/279 |
| 2008/0256616 A1* | 10/2008 | Guarraci et al. | 726/9 |
| 2008/0263629 A1* | 10/2008 | Anderson | 726/2 |
| 2008/0295157 A1 | 11/2008 | Wong et al. | |
| 2009/0106433 A1* | 4/2009 | Knouse et al. | 709/229 |
| 2009/0125972 A1* | 5/2009 | Hinton et al. | 726/1 |
| 2009/0132828 A1* | 5/2009 | Kiester et al. | 713/185 |
| 2009/0222665 A1* | 9/2009 | Sheehan | 713/171 |
| 2009/0249440 A1* | 10/2009 | Platt et al. | 726/1 |
| 2009/0271847 A1* | 10/2009 | Karjala et al. | 726/6 |
| 2010/0077461 A1* | 3/2010 | Nguyen et al. | 726/5 |
| 2010/0100925 A1 | 4/2010 | Hinton | |
| 2010/0169640 A1* | 7/2010 | Smith et al. | 713/155 |
| 2011/0119747 A1* | 5/2011 | Lambiase | 726/8 |
| 2011/0277025 A1* | 11/2011 | Counterman | 726/8 |
| 2011/0296522 A1* | 12/2011 | Speyer et al. | 726/20 |
| 2012/0096544 A1 | 4/2012 | Hosoda | |
| 2012/0117610 A1* | 5/2012 | Pandya | 726/1 |
| 2012/0151563 A1* | 6/2012 | Bolik et al. | 726/6 |
| 2012/0259782 A1* | 10/2012 | Hammad | 705/44 |
| 2012/0291090 A1* | 11/2012 | Srinivasan et al. | 726/1 |
| 2012/0331535 A1* | 12/2012 | Anderson | 726/6 |
| 2013/0007845 A1* | 1/2013 | Chang et al. | 726/4 |
| 2013/0047195 A1* | 2/2013 | Radhakrishnan | 726/1 |
| 2013/0047206 A1* | 2/2013 | Radhakrishnan | 726/1 |
| 2013/0061319 A1 | 3/2013 | Yasuhara | |
| 2013/0198818 A1* | 8/2013 | Hitchcock et al. | 726/5 |
| 2013/0198821 A1* | 8/2013 | Hitchcock et al. | 726/6 |
| 2013/0198822 A1* | 8/2013 | Hitchcock et al. | 726/6 |
| 2013/0198823 A1* | 8/2013 | Hitchcock et al. | 726/6 |
| 2013/0340063 A1* | 12/2013 | Larsson | 726/9 |
| 2014/0090037 A1* | 3/2014 | Singh | 726/7 |

FOREIGN PATENT DOCUMENTS

| | | |
|---|---|---|
| JP | 08-263417 A | 10/1996 |
| JP | 2011-258000 A | 12/2011 |
| KR | 20120038892 A | 4/2012 |
| WO | 2009/038226 A1 | 3/2009 |

\* cited by examiner

FIG. 4

ADDITIONAL INSTALLATION OF APPLICATION

| INPUT PATH OF FILE | INSTALL |

MANAGEMENT OF INSTALLED APPLICATION

| UNINSTALL | LAUNCH | QUIT |

| LOGIN APPLICATION | STATUS |
|---|---|
| ○ 3rd-Party Login Application | INACTIVE |
| ◉ LOGIN APPLICATION 305 | RUNNING |

| UNINSTALL | LAUNCH | QUIT |

| APPLICATION | STATUS |
|---|---|
| ☐ APPLICATION 306 | RUNNING |
| ☐ APPLICATION 307 | RUNNING |
| ☐ APPLICATION 308 | RUNNING |

F I G. 5

| ACCOUNT | | | ~501 |
|---|---|---|---|
| | | 502 | |
| PASSWORD | | | |
| AUTHENTICATION DESTINATION | ▽ | | |
| | COMPANY DOMAIN | | |
| | LocalHost | | |
| | LDAP SERVER | 503 | |
| | IN-HOUSE SYSTEM | LOGIN | 504 |

505

AUTHENTICATION SERVER SETTING     [CANCEL] [UPDATE SETTING]

AUTHENTICATION SERVER 1

| DISPLAY NAME OF AUTHENTICATION DESTINATION | COMPANY DOMAIN |
|---|---|
| SERVER NAME | DOMAIN CONTROLLER 108 |
| SERVER ADDRESS | 172.24.123.123 |
| DOMAIN NAME | company.com |
| AUTHENTICATION PROTOCOL | ●Kerberos  ○LDAP  ○IN-HOUSE SYSTEM (UNIQUE PROTOCOL) |

AUTHENTICATION SERVER 2

| DISPLAY NAME OF AUTHENTICATION DESTINATION | LDAP SERVER |
|---|---|
| SERVER NAME | LDAP SERVER 113 |
| SERVER ADDRESS | 172.24.123.124 |
| DOMAIN NAME | |
| AUTHENTICATION PROTOCOL | ○Kerberos  ●LDAP  ○IN-HOUSE SYSTEM (UNIQUE PROTOCOL) |

AUTHENTICATION SERVER 3

| DISPLAY NAME OF AUTHENTICATION DESTINATION | IN-HOUSE SYSTEM |
|---|---|
| SERVER NAME | IN-HOUSE SYSTEM AUTHENTICATION SERVER 116 |
| SERVER ADDRESS | 172.24.123.345 |
| DOMAIN NAME | |
| AUTHENTICATION PROTOCOL | ○Kerberos  ○LDAP  ●IN-HOUSE SYSTEM (UNIQUE PROTOCOL) |

| Void SetUserCredential (String Protocol, int Type, Object value); | |
|---|---|
| ARGUMENT | |
| Protocol | AUTHENTICATION PROTOCOL USED IN USE AUTHENTICATION Kerberos, Local, LDAP Simple Bind, AND ARBITRARY CHARACTER STRING INDICATING UNIQUE PROTOCOL CAN BE DESIGNATED. |
| Type | TYPE OF USER CREDENTIAL INDICATE TYPES SUCH AS CHARACTER STRINGS (USER ACCOUNT, PASSWORD, DOMAIN NAME, ETC. OF PLAINTEXT), HASH VALUE OF PASSWORD, ENCRYPTED PASSWORD, TICKET (Kerberos TGT, SAML, ETC.), BIOLOGICAL INFORMATION (FINGERPRINT, ETC.), IC CARD INFORMATION POSSESSED BY USER, ETC. |
| Value | USER CREDENTIAL DATA |

602

| ListObject GetUserCredential (); | |
|---|---|
| RETURN VALUE | |
| | • RETURN ALL REFERABLE USER CREDENTIALS WHICH ARE STORED IN CREDENTIAL SHARING SERVICE AS LIST<br>• RETURN NULL IF NO REFERABLE USER CREDENTIAL IS STORED |

603

| ListObject GetUserCredential (String Protocol,); | |
|---|---|
| ARGUMENT | |
| Protocol | AUTHENTICATION PROTOCOL USED IN USE AUTHENTICATION Kerberos, Local, LDAP Simple Bind, AND ARBITRARY CHARACTER STRING INDICATING UNIQUE PROTOCOL CAN BE DESIGNATED. |
| RETURN VALUE | |
| | • RETURN REFERABLE USER CREDENTIAL DATA ASSOCIATED WITH Protocol<br>• RETURN NULL WHEN NO USER CREDENTIAL IS STORED OR REFERENCE TO USER CREDENTIAL ASSOCIATED WITH Protocol IS INHIBITED |

FIG. 7

701 — AUTHENTICATION PROTOCOL : Kerberos
USER CREDENTIAL TYPE : Kerberos TGT
USER CREDENTIAL DATA : XXXXXXXX 702 — AUTHENTICATION PROTOCOL : Local
USER CREDENTIAL TYPE : PlainText
USER CREDENTIAL DATA :
   ID : User001
   PW : Password 703 — AUTHENTICATION PROTOCOL : LDAP Simple Bind
USER CREDENTIAL TYPE : PlainText
USER CREDENTIAL DATA :
   ID : User001
   PW : Password 704 — AUTHENTICATION PROTOCOL : Custom
USER CREDENTIAL TYPE : PlainText
USER CREDENTIAL DATA :
   ID : User001
   PW : Password

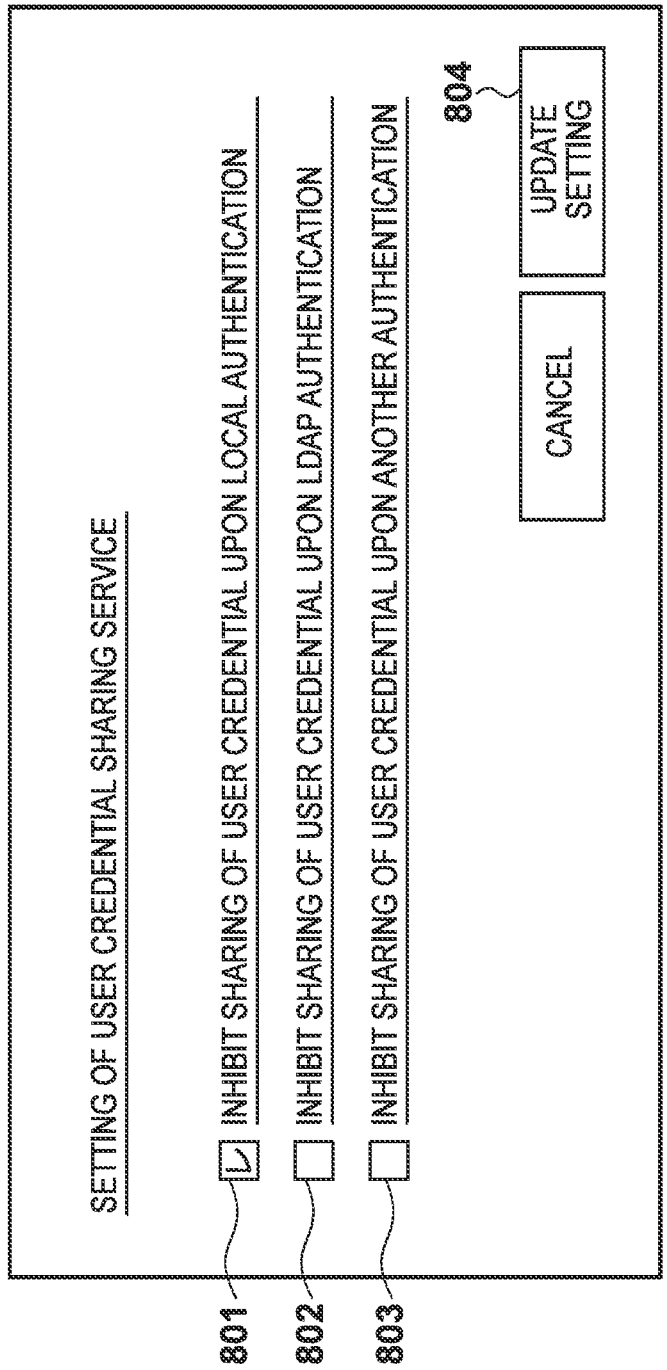

TRANSMISSION OF SCAN DOCUMENT

DOCUMENT FORMAT  ◉ PDF  ○ JPEG

TRANSMISSION DESTINATION

| FILE SHARING SERVER 110(SMB) |
| FILE SHARING SERVER 112(SMB) |
| FILE SHARING SERVER 115(WebDAV) |
| FILE SHARING SERVER 118(WebDAV) |

[SCAN AND TRANSMIT]

902

TRANSMISSION OF SCAN DOCUMENT:
INPUT AUTHENTICATION INFORMATION

TRANSMISSION DESTINATION: FILE SHARING SERVER 110

ACCOUNT  [          ]
PASSWORD [          ]

[ OK ]   [ CANCEL ]

FIG. 12A

TABLE a

| USER REPOSITORY 1201 | LOGIN ACCOUNT 1202 | | CONNECTION DESTINATION | | | | PERMISSION/ INHIBITION OF SINGLE SIGN-ON 1207 |
|---|---|---|---|---|---|---|---|
| | | USER CREDENTIAL | FILE SHARING SERVER 1203 | USER REPOSITORY 1204 | AUTHENTICATION PROTOCOL 1205 | LAN 1206 | |
| 102 | Local | Plain Text | 110 | 109 | SMB Kerberos | 103 | × (1208) |
| 102 | Local | Plain Text | 111 | 114 | SMB NTLM | 104 | □ (1209) |
| 109 | Domain | Kerberos TGT | 110 | 109 | SMB Kerberos | 103 | ○ (1210) |
| 109 | Domain | Kerberos TGT | 111 | 112 | SMB NTLM | 104 | × (1211) |

FIG. 12B

TABLE b

| USER REPOSITORY 1201 | LOGIN ACCOUNT 1202 | | CONNECTION DESTINATION | | | | PERMISSION/ INHIBITION OF SINGLE SIGN-ON 1207 |
|---|---|---|---|---|---|---|---|
| | | USER CREDENTIAL | FILE SHARING SERVER 1203 | USER REPOSITORY 1204 | AUTHENTICATION PROTOCOL 1205 | LAN 1206 | |
| 109 | Domain | Kerberos TGT | 110 | 109 | SMB Kerberos | 103 | ○ (1212) |
| 109 | Domain | Kerberos TGT | 115 | 114 | HTTP Basic | 105 | × (1213) |
| 114 | LDAP | Plain Text | 110 | 109 | SMB Kerberos | 103 | × (1214) |
| 114 | LDAP | Plain Text | 115 | 114 | HTTP Basic | 105 | △ (1215) |

FIG. 12C

TABLE c

| | LOGIN ACCOUNT | | CONNECTION DESTINATION | | | | PERMISSION/ INHIBITION OF SINGLE SIGN-ON |
|---|---|---|---|---|---|---|---|
| USER REPOSI- TORY (1201) | USER CREDENTIAL (1202) | | FILE SHARING SERVER (1203) | USER REPOSI- TORY (1204) | AUTHENTICATION PROTOCOL (1205) | LAN (1206) | (1207) |
| 102 | Local | Plain Text | 110 | 109 | SMB Kerberos | 103 | × (1216) |
| 102 | Local | Plain Text | 111 | 112 | SMB NTLM | 104 | □ (1217) |
| 102 | Local | Plain Text | 118 | 117 | HTTP Basic | 106 | □ (1218) |
| 109 | Domain | Kerberos TGT | 110 | 109 | SMB Kerberos | 103 | ○ (1219) |
| 109 | Domain | Kerberos TGT | 111 | 112 | SMB NTLM | 104 | × (1220) |
| 109 | Domain | Kerberos TGT | 118 | 117 | HTTP Basic | 106 | × (1221) |
| 117 | Custom | Plain Text | 110 | 109 | SMB Kerberos | 103 | × (1222) |
| 117 | Custom | Plain Text | 111 | 112 | SMB NTLM | 104 | □ (1223) |
| 117 | Custom | Plain Text | 118 | 117 | HTTP Basic | 106 | △ (1224) |

INFORMATION PROCESSING APPARATUS, CONTROL METHOD THEREOF, STORAGE MEDIUM, AND IMAGE PROCESSING APPARATUS

BACKGROUND OF THE INVENTION

1. Field of the Invention

The present invention relates to an information processing apparatus, control method thereof, storage medium, and image processing apparatus.

2. Description of the Related Art

An image processing apparatus such as an existing copying machine and MFP (Multi Function Peripheral) can access an external server using an account used at a login timing to a device. In order to implement such single sign-on, Japanese Patent Laid-Open No. 2011-258000 has proposed a mechanism which allows applications to share user credentials. For example, user credentials acquired when the user logs into a device are cached and shared, thus avoiding from prompting the user to input an account and password again at an access timing to an external server. Thus, the user need not input the same account and password on many occasions.

Japanese Patent Laid-Open No. 8-263417 has proposed a network provider which attempts to access resources of an independent network using data at the login timing to a local computer, so as to implement single sign-on.

However, the aforementioned related arts suffer the following problems. For example, office environments in corporations include an environment suitable for use of a single sign-on function used to access an external server using an account used at a login timing to a device, an unsuitable environment, or a mixed environment. If the single sign-on function is valid in the environment unsuitable for use of the single sign-on function, a problem of low security is posed. In the system of the related art, the mixed environment including the environment suitable for use of the single sign-on function and that unsuitable for use of that function is not taken into consideration, and flexible use settings of the single sign-on function cannot be made in consideration of an office environment in a corporation. The environment suitable for use of the single sign-on function includes an environment in which an IT administrator in the corporation uniformly manages access accounts of computers and devices. In such environment, office staff can access every node on the network using the same account. The environment unsuitable for use of the single sign-on function includes an environment in which an IT administrator in the corporation does not uniformly manage access accounts of nodes. The mixed environment of the environment suitable for use of the single sign-on function and unsuitable environment includes an environment in which nodes and networks, access accounts of which are uniformly managed by an IT administrator and those, access accounts of which are not uniformly managed, are mixed. For example, in an environment in which both domain accounts and local accounts are available as access accounts to nodes, the IT administrator manages the domain accounts, but he or she does not manage the local accounts. Such case also corresponds to the mixed environment.

Authentication protocols which can limit a security domain and use user credentials and protocols which cannot limit the security domain and use user credentials are available. When the user attempts single sign-on to another node from a device using the authentication protocol that cannot limit the security domain in the environment unsuitable for use of the single sign-on function, the following problem is posed. For example, the device accesses the node without judging whether or not an access account of the access destination node is uniformly managed, and illicitly accesses that node if the same authentication data as that of a device login timing which is stored in the access destination node by accident. In the environment that is unsuitable for use for the single sign-on function, the single sign-on function is uniformly inhibited from being used so as to solve that problem. However, in a mixed environment of the environment that is suitable for use of the single sign-on function and unsuitable environment, the problem cannot be solved by the aforementioned method.

SUMMARY OF THE INVENTION

The present invention enables realization of a user credential sharing mechanism which suitably implements a single sign-on function while preventing illicit access that occurs when authentication data is accidentally matched, even in a mixed environment of an environment that is suitable for use for the single sign-on function and one which is not.

One aspect of the present invention provides an information processing apparatus comprising: an authentication unit configured to execute processing for user authentication using any one of a plurality of authentication methods; a management unit configured to manage a user credential generated when the authentication unit authenticates a user; a setting unit configured to record setting contents whether or not to permit the credential managed by the management unit to be used for a specific authentication method of the plurality of authentication methods of the authentication unit, to execute a function included in the information processing apparatus; a decision unit configured to decide, when the authentication unit authenticates a user using the specific authentication method and the user instructs to execute the function included in the information processing apparatus, whether or not the function uses the user credential according to setting contents set by the setting unit; and a control unit configured to control, when the decision unit decides to permit use of the credential, to execute the function using the credential, and to control, when the decision unit decides to inhibit use of the credential, to prompt the user to execute user authentication.

Another aspect of the present invention provides a control method of an information processing apparatus, which includes an authentication unit configured to execute processing for user authentication using any one of a plurality of authentication methods and a management unit configured to manage a credential generated when the authentication unit authenticates a user, the method comprising: a setting step of setting whether or not to permit the credential managed by the management unit to be used for a specific authentication method of the plurality of authentication methods of the authentication unit, to execute a function included in the information processing apparatus; a decision step of deciding, when the authentication unit authenticates a user using the specific authentication method and the user instructs to execute the function included in the information processing apparatus, whether or not the function uses the user credential according to setting contents set in the setting step; and a control step of controlling, when it is decided in the decision step to permit use of the credential, to execute the function using the credential, and controlling, when it is decided in the decision step to inhibit use of the credential, to prompt the user to execute user authentication.

Still another aspect of the present invention provides a non-transitory computer-readable storage medium storing a program for causing a computer to perform the method.

Yet still another aspect of the present invention provides an image processing apparatus having a single sign-on function, comprising: an authentication unit configured to authenticate a user who logs in to the image processing apparatus; a storage unit configured to store a user credential including authentication information used in user authentication by the authentication unit and information indicating an authentication protocol related to the user credential in association with each other; a reading unit configured to read an image from an original; a determination unit configured to determine, when an instruction to transmit image data of an original read by the reading unit to an external apparatus connected to be able to communicate with the image processing apparatus is received from a user, whether or not the external apparatus is accessible using the user credential, based on the user credential of the user and the information indicating the authentication, which are stored in the storage unit; and a control unit configured to prompt, when the determination unit determines that the external apparatus is not accessible using the user credential, to input an account accessible to the external apparatus, and to transmit, when the determination unit determines that the external apparatus is accessible using the user credential, the image data of the original read by the reading unit to the external apparatus, wherein when the authentication protocol is an authentication protocol which is configured to limit a security domain, the determination unit determines that the external apparatus is accessible using the user credential, and when the authentication protocol is an authentication protocol which is not configured to limit a security domain, the determination unit determines that the external apparatus is not accessible using the user credential.

Further features of the present invention will be apparent from the following description of exemplary embodiments with reference to the attached drawings.

BRIEF DESCRIPTION OF THE DRAWINGS

FIG. 4 is a view showing a user interface required to manage applications;

FIG. 5 is a view showing a user interface (login screen and authentication server registration screen) included in a login application;

FIG. 6 is a view showing APIs included in a user credential sharing service;

FIG. 7 is a view showing user credentials stored by the user credential sharing service;

FIG. 8 is a view showing a user interface of the user credential sharing service;

FIG. 9 is a view showing a user interface of a transmission application;

FIGS. 12A to 12C show tables that represent combinations of user credentials and connection destination file sharing servers.

DESCRIPTION OF THE EMBODIMENTS

Figure 1:
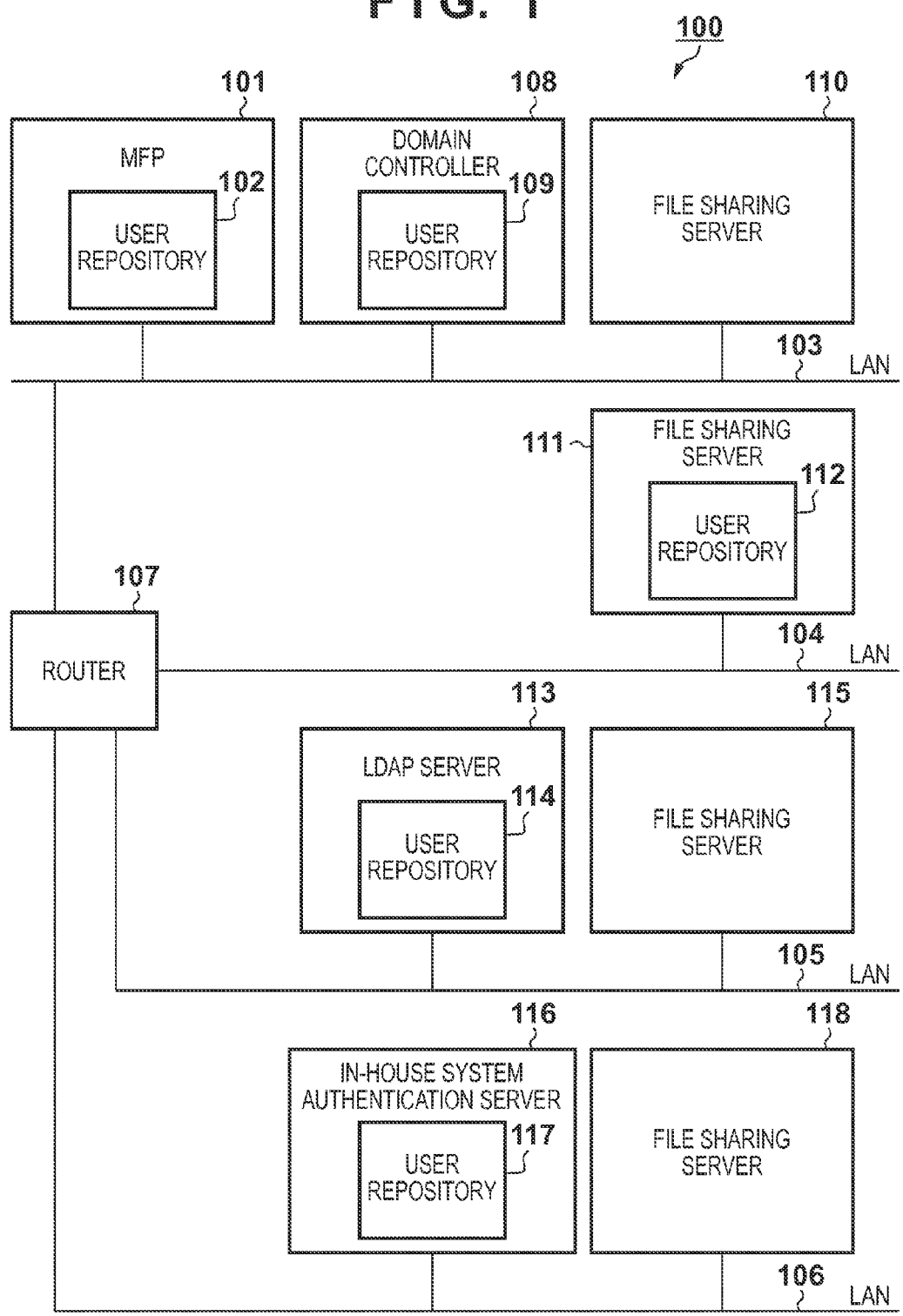
FIG. 1 is a schematic block diagram showing the node arrangement on a network and a layout of user repositories.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Arrangement>

An embodiment of the present invention will be described below with reference to FIGS. 1 to 12. This embodiment will exemplify use of an MFP as an example of an information processing apparatus (image processing apparatus). The node arrangement on a network and a layout of user repositories in this embodiment will be described first with reference to FIG. 1. In this embodiment, a storage area of accounts used for user authentication will be generically referred to as a user repository.

A user credential sharing service 100 according to this embodiment includes an MFP 101, domain controller 108, LDAP (Lightweight Directory Access Protocol) server 113, in-house system authentication server 116, file sharing servers (external apparatuses) 110, 111, 115, and 118, and router 107. Assume that respective components are connected to be able to communicate with each other via LANs 103, 104, 105, and 106 as in-house local networks and the router 107. In this embodiment, assume that the MFP 101 is connected to the in-house LAN 103. The MFP 101 includes a user repository 102 required to register accounts in a node of the MFP 101.

To the LAN 103, the domain controller 108 and file sharing server 110 are connected. Assume that the domain controller 108 configures a COMPANY domain having a domain name "COMPANY". The domain controller 108 includes a user repository 109 required to register users who access nodes under the control of the node controller. For example, when the domain controller is built using Windows® OS functions, ActiveDirectory® can be used as a user repository. Windows® and ActiveDirectory® are registered trademarks of Microsoft. Assume that the domain controller 108 includes a Kerberos KDC (Key Distribution Center) function. The file sharing server 110 is configured to join the COMPANY domain. The file sharing server 110 publicizes a network shared folder accessible by an SMB (Server Message Block) protocol. The user can access to the network shared folder publicized by the file sharing server 110 using only an account registered in the user repository 109. The SMB connection uses Kerberos authentication. The Kerberos authentication is a name of a network authentication protocol which is required to correctly authenticate the connecting user in a public network environment such as the Internet, and is defined by RFC1510. In the Kerberos authentication, a password is managed by KDC. The KDC authenticates a password received from a user, and issues a ticket granting ticket to an authentic user. The authenticated user can use various network services using the issued ticket.

To the LAN 104, the file sharing server 111 is connected. The file sharing server 111 publicizes a network shared folder accessible by the SMB protocol. The network shared folder of the file sharing server 111 is set in advance to be accessible by only an account registered in a user repository 112 included in the file sharing server 111. The SMB connection uses NTLM (Windows® NT LAN Manager authentication) authentication data.

To the LAN 105, the LDAP server 113 and file sharing server 115 are connected. The LDAP server 113 includes a user repository 114, and is set in advance to allow user authentication upon reception of an external LDAP Simple Bind connection request. The LDAP server 113 can establish a user repository and user authentication mechanism using, for example, the Linux® OS and Open LDAP. The file sharing server 115 functions as a WebDAV server which allows read/write accesses of files by a WebDAV protocol. The WebDAV of the file sharing server 115 is set in advance to be accessible by only an account registered in the user repository 114 of the LDAP server 113. The WebDAV server can be established using, for example, Linux® OS and Apache. The connection to the WebDAV uses HTTP Basic authentication.

To the LAN 106, the in-house system authentication server 116 and file sharing server 118 are connected. The in-house system authentication server 116 includes a user repository 117, and functions as an authentication service required to access an in-house system. For example, the in-house system authentication server 116 includes the user repository 117 including a user authentication mechanism of a unique protocol and SQL database. The file sharing server 118 publicizes a Web service which allows read/write accesses of files by the WebDAV protocol. Connection to the WebDAV uses HTTP Basic authentication. The file sharing server 118 incorporates an agent program used to execute user authentication in cooperation with the in-house system authentication server 116, and is set in advance to be accessible by only an account registered in the user repository 117. Assume that a plurality of personal computers and MFPs are connected to a local area network in a corporation.

<Single Sign-on>

A singe sign-on function which allows access to an external server using an account used at the login timing to a device (for example, MFP 101) will be described below. Office environments in corporations include an environment suitable for use of the single sign-on function used to access an external server using an account used at a login timing to a device, an unsuitable environment, or their mixed environment.

The environment suitable for use of the single sign-on function indicates an environment in which an IT administrator in the corporation uniformly manages access accounts of computers and devices. In such environment, office staff can access every nodes on the network using the same account. For example, the following environments are known:

an environment in which an IT administrator places a domain controller on a network, and nodes on the network are joined to a domain;

an environment in which an IT administrator places an LDAP server as an authentication server on a network, and sets to authenticate accesses to respective nodes by the LDAP server; and an environment in which access accounts to devices and computers are registered as local accounts for respective nodes, but an IT administrator uniformly manages by registering the same account and password for all nodes.

The environment unsuitable for use of the single sign-on function indicates an environment in which an IT administrator in the corporation does not uniformly manage access accounts of nodes. For example, the following environments are known:

an environment in which there is no IT administrator who manages access accounts of computers and devices; and an environment in which an IT administrator grants permission to office staff to freely establish a node accessible from a network, and to freely register an account in each node.

The mixed environment of the environment suitable for use of the single sign-on function and unsuitable environment indicates an environment in which nodes and networks, access accounts of which are uniformly managed by an IT administrator and those, access accounts of which are not uniformly managed, are mixed. For example, in an environment in which both domain accounts and local accounts are available as access accounts to nodes, the IT administrator manages the domain accounts, but he or she does not manage the local accounts. Such case also corresponds to the mixed environment.

An authentication protocol which can limit a security domain and uses user credentials and one which cannot limit the security domain and uses user credentials are available. For example, the authentication protocol which can limit a security domain and uses user credentials includes the following protocols:

an authentication protocol using encrypted authentication data which can be interpreted by only a specific code (Kerberos or the like corresponds to this protocol);

an authentication protocol which uses an authenticate token of SAML (Security Assertion Markup Language) with a digital signature; and an authentication protocol which uses authentication data including information related to a domain.

The authentication protocol which cannot limit a security domain includes:

authentication data which does not include any domain information;

an account and password of plaintext; and a hash value of a password in a generally used algorithm.

When the user attempts single sign-on to another node from a device using the authentication protocol that cannot limit the security domain in the environment unsuitable for use of the single sign-on function, the following problem is posed. For example, the device attempts to access the node without judging whether or not an access account of the access destination node is uniformly managed. As a result of the access attempt, the device illicitly accesses that node if the same authentication data as that at a device login timing is stored in the access destination node by accident.

In the environment unsuitable for use of the single sign-on function, the single sign-on function is uniformly inhibited from being used so as to solve that problem. On the other hand, in the mixed environment of the environment suitable for use of the single sign-on function and unsuitable environment, the user wants to use the single sign-on function while preventing illicit accesses made upon accidental matches of authentication data. Hence, the user credential sharing system 100 according to this embodiment solves the above problem. A detailed description will be given below.

<Hardware Arrangement of MFP>

Figure 2:
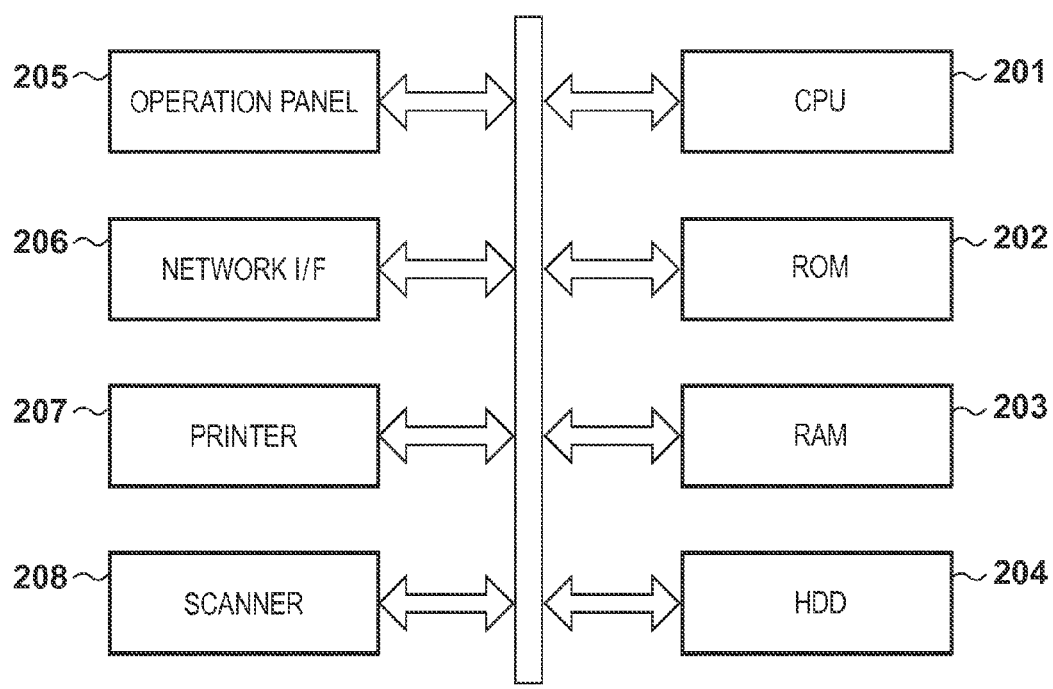
FIG. 2 is a block diagram showing the hardware arrangement of an MFP.

The hardware arrangement of the MFP 101 will be described below with reference to FIG. 2. Reference numeral 201 denotes a CPU which controls the overall MFP; and 202, a ROM which stores software programs to be executed by the CPU 201 and font data. Reference numeral 203 denotes a RAM used as a work area of the CPU 201, a reception buffer, and an image rendering area. Reference numeral 204 denotes an HDD (Hard Disk Drive) which records program codes of software and data such as user authentication information. A partial area of the HDD 204 is also used as an area of the user repository 102 sown in FIG. 1. Reference numeral 205 denotes an operation panel including various switches and buttons, and a liquid crystal display unit used to display messages. Reference numeral 206 denotes a network interface required to connect a network. Reference numeral 207 denotes a printer which prints on a print sheet. Reference numeral 208 denotes a scanner which reads an original such as a printed document and converts it into image data.

<Software Configuration of MFP 101>

Figure 3:
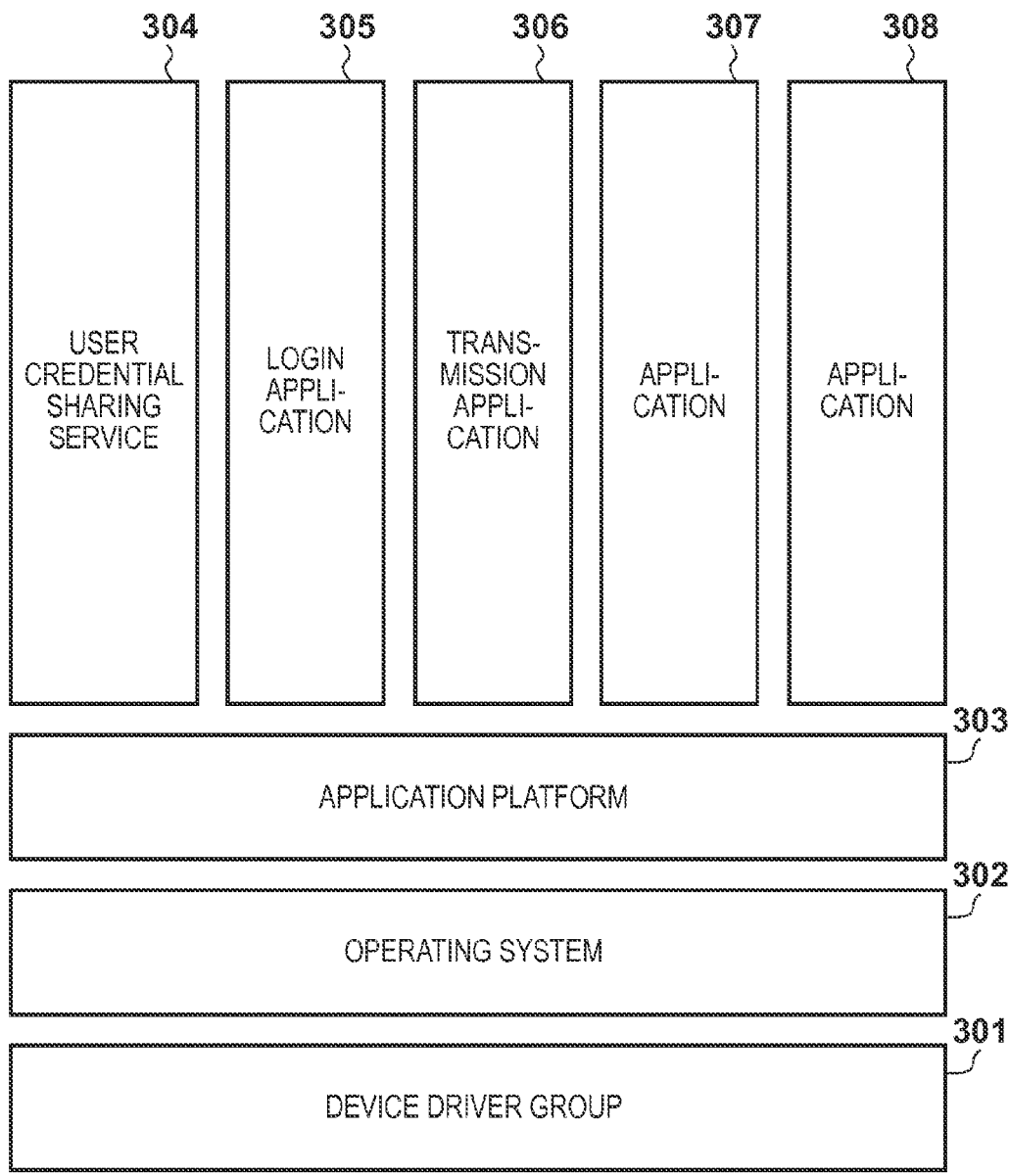
FIG. 3 is a view showing the software configuration of the MFP.

The software configuration of the MFP 101 will be described below with reference to FIG. 3. The following execution program of software is copied from the ROM 202 and HDD 204 to the RAM 203 and is executed by the CPU

201. A device driver group 301 is required to control various hardware components. Reference numeral 302 denotes an operating system. Reference numeral 303 denotes an application platform required to control to install/uninstall and launch/quit embedded applications of the MFP 101. For example, the application platform 303 can be configured to include a JAVA® platform and OSGi framework. JAVA® is a registered trademark of Oracle. The OSGi framework is a JAVA®-based service platform defined by OSGi Alliance (standard-setting organization). In the application platform 303, the user can additionally install an application in addition to those included in the MF 101 since factory delivery. For example, the application platform 303 provides a servlet including a user interface (FIG. 6) required to manage applications. An administrator of the MFP 101 can carry out additional installation of an application by designating an execution file (JAR file) of the application via a network. FIG. 4 shows a screen which is provided by the application platform 303 and is required to control to install/uninstall or launch/quit applications. The application platform 303 can manage applications based on a user instruction input via the screen shown in FIG. 4.

Types of applications which run on the application platform 303 will be described below. A simple description of "application" will be used unless a type of an application is limited.

System application: an application included in the MFP 101 since factory delivery.
    Login application: a special application required to authenticate a user who logs in to the MFP 101.
    General application: an application other than the login application, which application can be installed/uninstalled by the user.

A user credential sharing service 304 runs as a system application. A login application 305 performs user authentication by displaying a login screen 501 on the operation panel. The login screen 501 will be described in detail later with reference to FIG. 5. A transmission application 306 is a general application including a function of externally transmitting a scanned image. Reference numerals 307 and 308 denote other general applications.

<User Credential>

In this embodiment, information used in user authentication and information which is generated after the user authentication to certify the user will be generically referred to as user credentials. For example, the user credentials include:
    an account and password of plaintext;
    hash values of an account and password of plaintext;
    a Kerberos TGT (Ticket Granting Ticket), and a ticket issued by a TGS (Ticket Granting Server); and
    an authentication token such as SAML.

<User Credential Sharing Service 304>

The user credential sharing service 304 is a service which allows sharing of user credentials between a plurality of applications. An API group which is included in the user credential sharing service 304 and can be used from applications will be described below with reference to FIG. 6. An API 601 stores user credentials designated by an application in the RAM 203 in association with an authentication protocol and information associated with a type of user credential data. In the authentication protocol used by the API, character strings "Kerberos", "Local", and "LDAP Simple Bind" are specified in advance. When an application uses an authentication protocol other than above, an arbitrary character string can be designated. For example, one or a plurality of data 701 to 704 in FIG. 7 are stored.

An API 602 acquires all user credentials stored in the RAM 203 and returns them to an application. An API 603 acquires user credentials associated with an authentication protocol designated by an argument, and returns them to an application. When the user credential sharing service 304 detects a logout operation of the user or a shutdown operation of the MFP 101, it discards user credential data stored in the RAM 203. The user credential sharing service 304 includes a user interface which allows the administrator of the MFP 101 to set operations of the user credential sharing service 304. The user interface will be described below with reference to FIG. 8. As shown in FIG. 8, a check box 801 is a switch used to change if user credentials related to an authentication protocol "Local" are inhibited from being returned. A check box 802 is a switch used to change if user credentials related to "LDAP Simple Bind" are inhibited from being returned. A check box 803 is a switch used to change if user credentials related to authentication protocols which are not specified in advance (authentication protocols other than Kerberos, Local, and LDAP Simple Bind) are inhibited from being returned. When the administrator of the MFP 101 checks each check box and presses a setting update button 804, the corresponding switch is valid. That is, the administrator of the MFP 101 can make inhibition settings of sharing of user credentials for respective authentication protocol types using the user interface shown in FIG. 8.

<Login Application 305>

The login application 305 will be described below with reference to FIG. 5. The login application 305 displays the login screen 501 on the operation panel 205 and authenticates a user who wants to log in to the MFP 101. The login screen 501 includes a drop-down list 503 used to select an authentication destination in addition to text boxes 502 used to input an account and password. Based on the authentication destination selected from this list, an authentication protocol related to user credentials may be decided. Also, the screen 501 may prompt the user to further input an authentication protocol. The login application 305 includes a user interface required to register an account in advance in the user repository 102. Furthermore, the login application 305 includes a user authentication function using accounts in the user repositories 109, 114, and 117 managed by the external authentication servers. The login application 305 includes an authentication server registration screen 505 used to store information required to cooperate with the external authentication servers in the HDD 204 of the MFP 101. The authentication server registration screen 505 is configured as a Web page accessible by only device administrators using a general Web browser.

For example, the authentication server registration screen 505 allows to register the following information, as shown in FIG. 5:
    a display name displayed in the drop-down list 503 indicating the authentication destination of the login screen 501;
    a server name;
    a network address of the server;
    a domain name; and
    an authentication protocol used in user authentication.

In this embodiment, the domain controller 108, LDAP server 113, and in-house system authentication server 116 can be registered as authentication servers. The drop-down list 503 displays "LocalHost". Since "LocalHost" is an authentication using the user repository 102 included in the MFP 101 itself, it is displayed on the drop-down list 503 even when that authentication is registered on the screen 505. The login application 305 displays display names on the authentication destinations according to the authentication server registration state.

Upon detection of pressing of a login button 504, the login application 305 acquires an account and password input to the text boxes 502 and an authentication destination (a value selected from the drop-down list 503). Next, the login application 305 attempts user authentication using information such as the user repository, authentication server, and authentication protocol related to the authentication destination. If the user authentication has succeeded, the login application 305 requests the user credential sharing service 304 to store user credentials together with the authentication protocol information via the API 601. The relationship among character strings displayed as the authentication destinations (drop-down list 503), user repositories, authentication servers, authentication protocols, and user credentials to be stored in the user credential sharing service 304 when the authentication has succeeded in this embodiment will be described below.

<Authentication Destination: LocalHost>

"LocalHost" is associated with the user repository 102. The authentication protocol is associated with "Local". The login application 305 executes user authentication by collating the account and password acquired from the text box 502 with data registered in the user repository 102. If the user authentication has succeeded, the login application 305 requests the user credential sharing service 304 to store the account and password of plaintext via the API 601. The login application 305 designates "Local" in an argument indicating an authentication protocol of the API 601.

<Authentication Destination: COMPANY Domain>

"COMPANY domain" is associated with the domain controller 108 which manages the user repository 112. The authentication protocol is associated with "Kerberos". The login application 305 attempts user authentication with respect to the domain controller 108 by the Kerberos protocol using the account and password acquired from the text boxes 502 and a domain name (company.com) registered in advance. If the user authentication has succeeded, the login application 305 requests the user credential sharing service 304 to store a TGT acquired at the time of Kerberos authentication as a user credential. The login application 305 designates "Kerberos" in an argument indicating an authentication protocol of the API 601.

<Authentication Destination: LDAP Server>

"LDAP server" is associated with the LDAP server 113 which manages the user repository 114. The authentication protocol is associated with "LDAP Simple Bind". The login application 305 attempts user authentication with respect to the LDAP server 113 by "LDAP Simple Bind" using the account and password acquired from the text boxes 502. If the user authentication has succeeded, the login application 305 requests the user credential sharing service 304 to store the account and password of plaintext via the API 601. The login application 305 designates "LDAP Simple Bind" in an argument indicating an authentication protocol of the API 601.

<Authentication Destination: In-house System>

"In-house system" is associated with the in-house system authentication server 116 which manages the user repository 117. The login application 305 attempts user authentication with respect to the in-house system authentication server 116 by a unique protocol installed in the in-house system authentication server 116 using the account and password acquired from the text boxes 502. If the user authentication has succeeded, the login application 305 requests the user credential sharing service 304 to store the account and password of plaintext via the API 601. The login application 305 designates "custom" in an argument indicating an authentication protocol of the API 601.

<Transmission Application 306>

The transmission application 306 can transmit digital data of a document read from the scanner 208 to a file sharing server (external apparatus). The transmission application 306 includes a user interface shown in FIG. 9. The user can designate, on a screen 901, a file format (PDF, JPEG, etc.) of digital data read from the scanner 208, a file sharing server registered in advance by the administrator of the MFP 101, and the like. The transmission application 306 can acquire user credentials of the login user of the MFP 101 via the APIs 602 and 603 of the user credential sharing service 304. The acquired user credentials are used in user authentication upon accessing the file sharing server. If the user authentication has succeeded, the transmission application 306 transmits and stores the file format of the digital data read from the scanner 208 to and in the file sharing server.

<Operation of User Credential Sharing Service>

Figure 10:
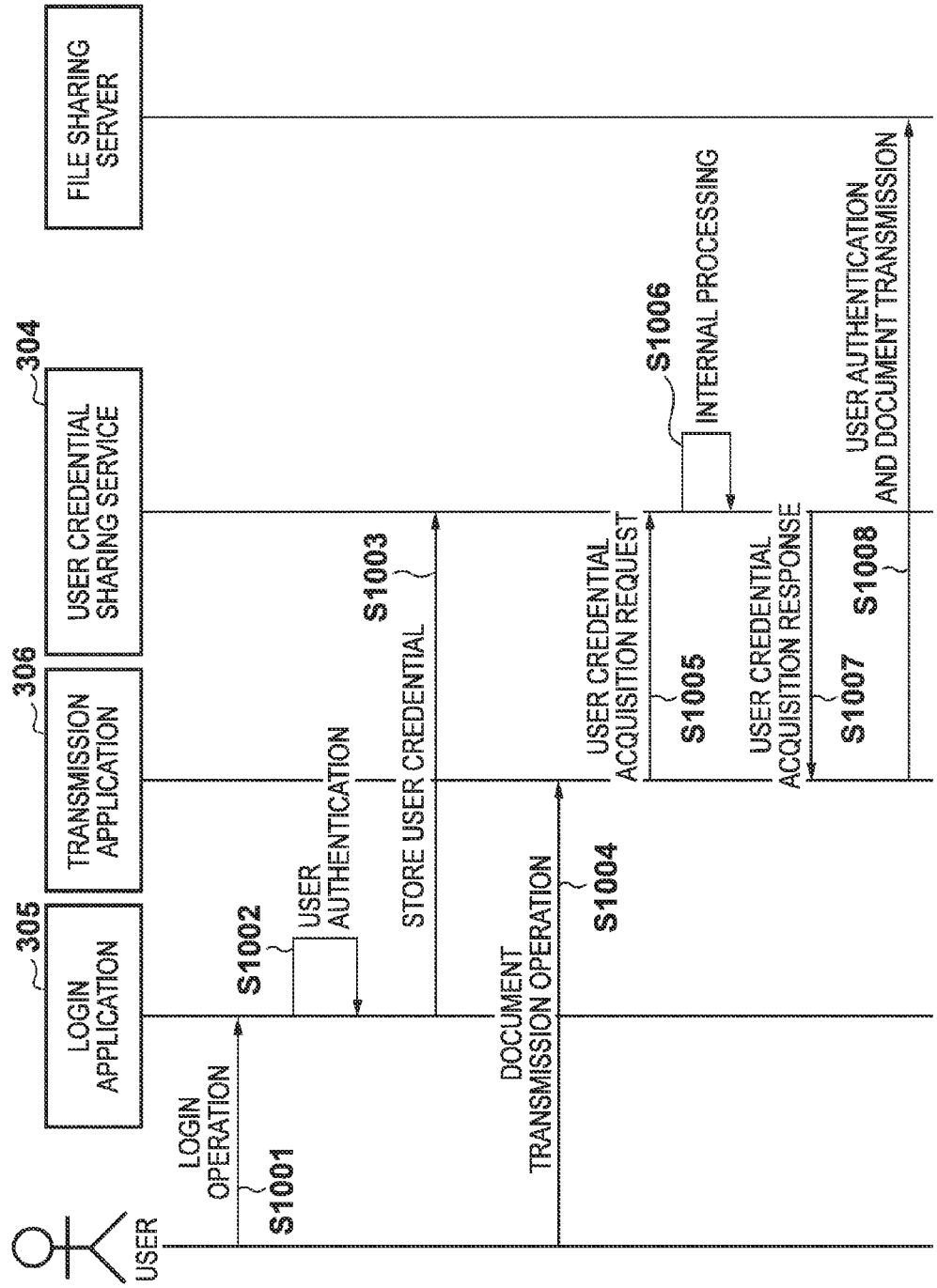
FIG. 10 is a chart showing a series of sequences upon operation of the MFP.
Figure 11:
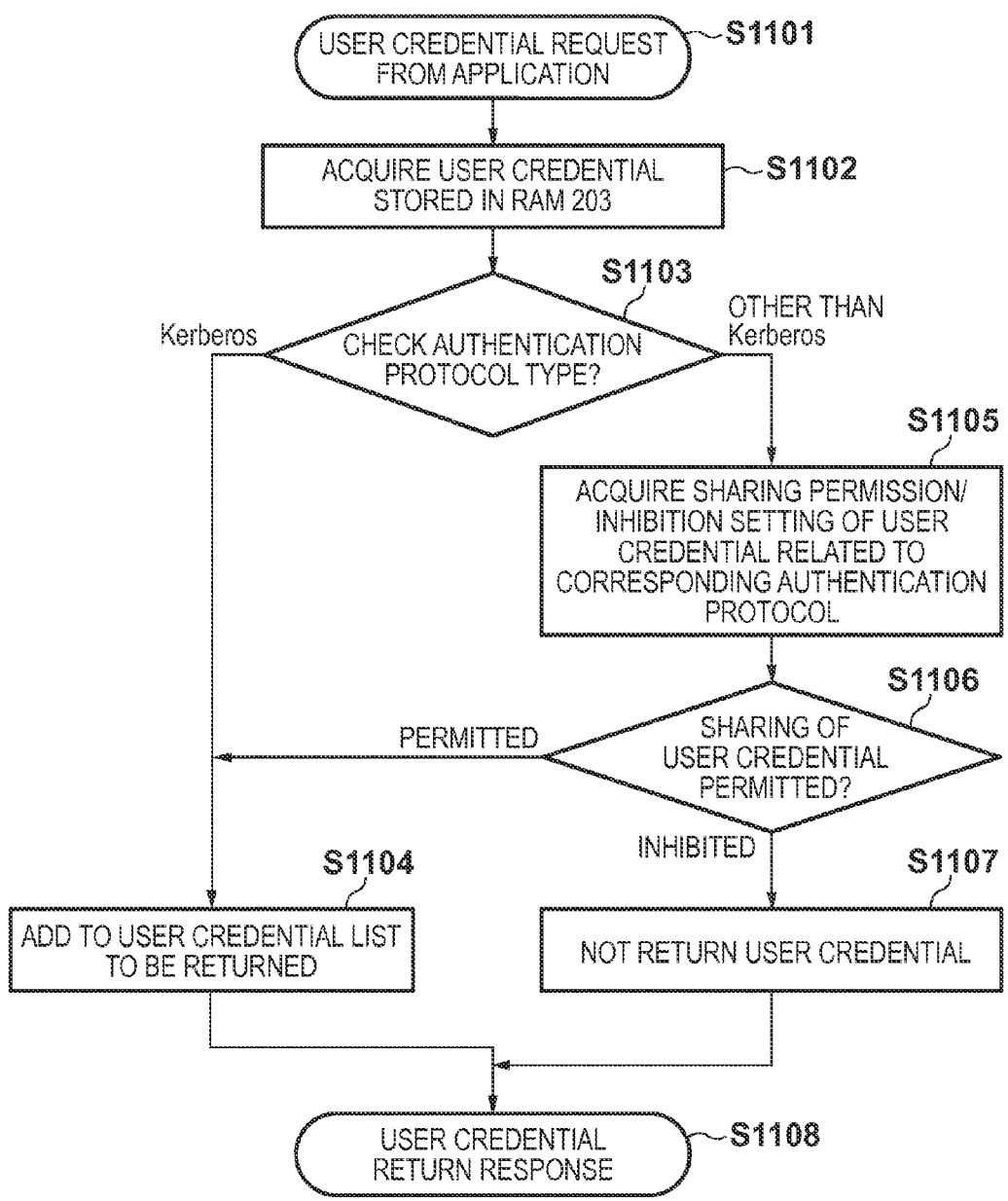
FIG. 11 is a flowchart showing the detailed processing sequence of the user credential sharing service.

The operation of the user credential sharing service according to this embodiment will be described below with reference to FIGS. 10 and 11. FIG. 10 shows a series of sequences from when the user logs in to the MFP 101 until he or she transmits a document using the transmission application 306. FIG. 11 shows the detailed processing sequence of the user credential sharing service in step S1006 in FIG. 10. Note that the processing to be described below is implemented when the CPU 201 of the MFP 101 reads out a control program stored in the ROM 202 or HDD 204 onto the RAM 203 and executes the readout program.

The login application 305 detects a login operation of the user via the login screen 501 in step S1001, and executes user authentication in step S1002. If the authentication destination indicates an external server, the login application 305 accesses the external authentication server in the user authentication processing in step S1002. If the user authentication has succeeded, the login application 305 requests the user credential sharing service 304 to store user credentials via the API 601 in step S1003. Upon reception of the user credential storage request, the user credential sharing service 304 stores the user credentials acquired via the API 601 in the RAM 203. Upon completion of the processing in step S1003, the user is allowed to operate the transmission application 306. In step S1004, if the transmission application 306 detects a document transmission operation by the user via the screen 901, the process advances to step S1005. In step S1005, the transmission application 306 transmits a user credential acquisition request of the login user to the user credential sharing service 304 via the API 602 or 603.

Upon reception of the user credential acquisition request, the user credential sharing service 304 analyzes an argument of the API and the like in the acquisition request and generates response information in step S1006. Detailed processing of step S1006 will be described later with reference to FIG. 11. Subsequently, in step S1007, the user credential sharing service 304 returns an acquisition response to the transmission application 306 according to the user credential response information generated in step S1006.

In step S1008, the transmission application 306 accesses the file sharing server using the user credentials returned in step S1007, and transmits a document. On the other hand, if the transmission application 306 cannot acquire any user credentials in step S1007 or if it cannot access the file sharing server using the acquired user credentials, the transmission application 306 displays a screen 902 shown in FIG. 9 to prompt the user to input an account accessible to the file sharing server.

<Detailed Sequence of Step S1006>

The detailed sequence of step S1006 will be described below with reference to FIG. 11. In step S1101, the user credential sharing service 304 starts processing when it receives the user credential acquisition request. In step S1002, the user credential sharing service 304 acquires user credentials stored in the RAM 203. In this case, when an authentication protocol is designated in an argument of the API 603, the user credential sharing service 304 acquires only user credentials; when no authentication protocol is designated, it acquires stored all user credentials.

Next, in step S1103, the user credential sharing service 304 confirms an authentication protocol type related to the acquired user credentials. For example, if the authentication protocol is "Kerberos", the user credential sharing service 304 judges the authentication protocol which can limit a security domain using user credentials, and adds it to a user credential list in step S1104. On the other hand, if the authentication protocol is other than "Kerberos", the user credential sharing service 304 judges the authentication protocol which cannot limit a security domain using user credentials, and the process advances to step S1105. The authentication protocol other than "Kerberos" indicates that which uses an account and password of plaintext. For example, the authentication protocol which cannot limit a security domain includes authentication using a local account and "LDAP Simple Bind".

Assume that the user credential sharing service 304 defines in advance information of a protocol which can limit a security domain and that which cannot limit a security domain. If the authentication protocol is not defined in the API shown in FIG. 6, and is an unknown authentication protocol for the user credential sharing service 304, the process similarly advances to step S1105.

In step S1105, the user credential sharing service 304 acquires a sharing permission/inhibition setting of the authentication protocol related to the acquired user credentials, and determines in step S1106 whether or not the sharing is permitted. The setting value is recorded in advance in the HDD 204 via the user interface shown in FIG. 8 with resect to each of the check boxes 801 to 803. An unknown authentication protocol for the user credential sharing service 304 is classified into other authentication protocols, and a value set by the check box 803 is referred to. If the setting value indicates that the sharing is permitted, the process advances to step S1104, and the user credential sharing service 304 adds the related user credentials to the user credential list. If the setting value indicates that the sharing is inhibited, the process advances to step S1107, and the user credential sharing service 304 determines that the user credentials are not returned. Finally, in step S1108, the user credential sharing service 304 returns the user credential list generated in step S1104 as a response in step S1005. If there is no returnable user credential, the user credential sharing service 304 returns "NULL". Thus, the MFP administrator sets the user credential sharing service according to an office environment (FIG. 8), thereby appropriately controlling use of the single sign-on function.

<Use Case>

Use cases and setting examples according to this embodiment will be described below with reference to FIGS. 12A to 12C. Columns of tables in FIGS. 12A to 12C will be described first. A column 1201 indicates a user repository as a management source of an account used in the login operation to the MFP 101. A column 1202 indicates user credentials stored in the user credential sharing service 304 after the login operation to the MFP 101. A column 1203 indicates a file sharing server as a connection destination upon transmission of a document. A column 1204 indicates a user repository as a management source of an account required to access the file sharing server. A column 1205 indicates an authentication protocol used to establish connection to the file sharing server.

A column 1206 indicates a LAN on which the file sharing server is connected. A column 1207 indicates OK/NG of single sign-on. A value "x" indicates that connection cannot be established even when user credentials acquired from the user credential sharing service are used. For example, in this case, user credentials in the column 1202 cannot be used for an authentication protocol in the column 1205 or authentication processing on the file sharing server side can generate an authentication error. A value "○" indicates that connection can always be established using user credentials acquired from the user credential sharing service irrespective of the setting of the user credential sharing service. A value "Δ" indicates that since the user repository in the column 1201 is the same that in the column 1204, connection can be established when it is set in the setting of the user credential sharing service (FIG. 8) that the sharing of user credentials in the column 1202 is permitted. A value "□" indicates that connection can be established using user credentials acquired from the user credential sharing service when the same account and password are purposely set in the different user repositories in the columns 1201 and 1204.

A use case indicated by table a will be described below. In this use case, the following conditions are assumed.

The MFP 101 can be connected to the LANs 103 and 104 but cannot be connected to the LANs 105 and 106 according to the settings of the router 107.

As an authentication destination used in a login operation to the MFP 101, it is set in advance that "LocalHost" and "COMPANY domain" can be used.

Under the aforementioned condition, whether or not to establish connection is decided irrespective of the presence/absence of the user credential sharing service settings (FIG. 8) in combinations indicated by rows 1208, 1210, and 1211. The administrator of the MFP 101 can make a setting of the user credential sharing service (FIG. 8) by focusing attention only on a combination indicated by a row 1209. That is, if the same account and password are purposely registered in the user repository 102 at the time of the login operation and the user repository 112 as a connection destination, sharing of user credentials related to "Local" is permitted. When the same account and password are not purposely registered, sharing of user credentials related to "Local" is inhibited so as to prevent illicit accesses by accidental matches.

A use case indicated by table b will be described below. In this use case, the following conditions are assumed.

The MFP 101 can be connected to the LANs 103 and 105 but cannot be connected to the LANs 104 and 106 according to the settings of the router 107.

As an authentication destination used in a login operation to the MFP 101, it is set in advance that "COMPANY domain" and "LDAP server" can be used.

Under the aforementioned condition, whether or not to establish connection is decided irrespective of the presence/absence of the user credential sharing service settings in combinations indicated by rows 1212, 1213, and 1214. On the other hand, in a combination indicated by a row 1215, since the same user repository 114 is to be used, the administrator of the MFP 101 need not set to inhibit sharing of user credentials.

A use case indicated by table c will be described below. In this use case, the following conditions are assumed.

The MFP 101 can be connected to the LANs 103, 104, and 106 but cannot be connected to the LAN 105 according to the settings of the router 107.

As an authentication destination used in a login operation to the MFP 101, it is set in advance that "LocalHost", "COMPANY domain" and "in-house system" can be used.

Under the aforementioned condition, whether or not to establish connection is decided irrespective of the presence/absence of the user credential sharing service settings in combinations indicated by rows 1216, 1219, 1220, 1221, and 1222. The administrator of the MFP 101 can make settings of the user credential sharing service (FIG. 8) by focusing attention only on combinations indicated by rows 1217, 1218, and 1223. That is, the administrator of the MFP 101 focuses attention on whether or not the same account and password are purposely registered in the user repositories 102, 112, and 117.

If the same account and password are purposely registered in all of the user repositories 102, 112, and 117, the administrator need not inhibit sharing of user credentials. If the same account and password are purposely registered in the user repositories 102 and 112, but a different account and password are set in the user repository 117, illicit accesses by accidental matches of authentication data have to be prevented for the combinations indicated by the rows 1218 and 1223. In this case, the administrator inhibits sharing of user credentials related to "Local" and "Custom" using settings of the check boxes 801 and 803 in FIG. 8. The same account and password are intentionally registered in the user repositories 112 and 117, and different account and password are registered in the user repository 102. In this case, for combinations indicated by the rows 1217 and 1218, illicit accesses by accidental matches of authentication data have to be prevented. In this case, the administrator inhibits sharing of user credentials related to "Local" using the setting of the check box 801 in FIG. 8. The administrator need not change sharing of user credentials related to "Custom" from permission.

As described above, the information processing apparatus (image processing apparatus) according to this embodiment inhibits sharing of user credentials in association with an authentication protocol which cannot limit a security domain. Thus, illicit accesses by accidental matches of authentication data can be prevented. Furthermore, the user interface used to set permission/inhibition of sharing of user credentials for each authentication protocols used in a login operation is provided. With this interface, even in a mixed environment of an environment suitable for use of the single sign-on function and unsuitable environment, the single sign-on function can be locally used while preventing illicit accesses by accidental matches of authentication data.

Also, the user credential sharing service 304 is configured to judge whether or not an authentication protocol related to user credentials is that which can limit a security domain. Thus, the user credential sharing service 304 can prompt the administrator of the MFP 101 who does not have any knowledge about authentication protocols to make sharing permission/inhibition settings of user credentials related to an authentication protocol which cannot limit a security domain. Also, a sharing permission/inhibition setting for an authentication protocol which is not defined in the APIs (FIG. 6) of the user credential sharing service 304 (check box 803) can be made. Thus, even when a login application incorporating an unknown authentication protocol for the user credential sharing service 304 runs on the MFP 101, permission/inhibition of user credential sharing can be controlled.

By practicing the present invention, a user credential sharing system which has the following advantages can be provided.

Since an administrator of a device can make user credential sharing settings in consideration of an office environment, use of a single sign-on function in a device can be appropriately controlled.

In an environment in which accounts are not uniformly managed, illicit accesses by accidental matches of authentication data can be prevented.

Even in an environment in which a plurality of authentication protocols which cannot limit a security domain are used at the same time, use permission/inhibition of a single sign-on function can be set for respective authentication protocols, and the single sign-on function can be locally used.

<Modification>

The above embodiment has exemplified the case in which a Kerberos TGT, account, and password are shared using the user credential sharing service 304. However, the present invention allows various modifications. For example, as other user credentials, a hash value of a password, ticket such as SAML, and the like may be shared using the user credential sharing service 304.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-116915 filed on May 22, 2012, which is hereby incorporated by reference herein in its entirety.

What is claimed is:

1. An information processing apparatus comprising:
a memory; and
a hardware processor, said hardware processor being configured to perform the functions of
an authentication unit configured to execute processing for user authentication using one of a plurality of authentication methods;
a management unit configured to manage a user credential generated when said authentication unit authenticates a user;
a setting unit configured to record setting contents which do not permit the credential managed by said management unit to be used to execute a function included in said information processing apparatus, wherein the setting contents are applied to a specific authentication method among the plurality of authentication methods that the authentication unit can use;

a decision unit configured to decide, when said authentication unit authenticates a user using the specific authentication method and the user instructs to execute the function included in said information processing apparatus, whether or not the function is permitted to use the user credential according to setting contents set by said setting unit; and a control unit configured to control, when said decision unit decides to permit use of the credential, to execute the function using the credential, and to control, when said decision unit decides to inhibit use of the credential, to prompt the user to execute user authentication.

2. The apparatus according to claim 1, wherein the specific authentication method is an authentication method which is not configured to limit a security domain.

3. The apparatus according to claim 2, wherein the authentication method which is not configured to limit a security domain is local authentication.

4. The apparatus according to claim 2, wherein the authentication method which is not configured to limit a security domain is LDAP authentication.

5. The apparatus according to claim 2, wherein when said authentication unit executes processing for user authentication using an unknown authentication method, the unknown authentication method is treated as an authentication protocol which is not configured to limit a security domain.

6. The apparatus according to claim 1, wherein a user credential generated based on user authentication using the specific authentication method by said authentication unit does not include domain information.

7. The apparatus according to claim 1, wherein a user credential generated based on user authentication using the specific authentication method by said authentication unit is plaintext information.

8. The apparatus according to claim 1, wherein the function is a transmission function of transmitting data to an external server, and the transmission function requests user authentication required to access the external server using the user credential or authentication information input by the user.

9. The apparatus according to claim 1, wherein said management unit stores a generated credential in a storage unit, and discards the credential stored in the storage unit when the user is released from an authentication state.

10. The apparatus according to claim 1, wherein an authentication method which is not the specific authentication method of the plurality of authentication methods is an authentication protocol which is configured to limit a security domain.

11. The apparatus according to claim 10, wherein the authentication protocol which is configured to limit a security domain is Kerberos authentication.

12. The apparatus according to claim 1, wherein when said decision unit decides to inhibit use of the credential, said control unit controls to display a screen used to input information required for user authentication on an operation screen.

13. A control method of an information processing apparatus, which includes an authentication unit configured to execute processing for user authentication using one of a plurality of authentication methods and a management unit configured to manage a credential generated when the authentication unit authenticates a user, the method comprising:

a setting step of setting in the information processing apparatus setting contents which do not permit the information processing apparatus to use the credential managed by the management unit to be used to execute a function included in the information processing apparatus, wherein the setting contents are applied to a specific authentication method among the plurality of authentication methods that the authentication unit can use;

a decision step of deciding by the information processing apparatus, when the user instructs the information processing apparatus to execute the function included in the information processing apparatus and the authentication unit authenticates a user using the specific authentication method, whether or not the function is permitted to use the user credential, based on the setting contents set in the setting step; and a control step of controlling, when the information processing apparatus decides in the decision step to permit use of the credential, to execute the function using the credential, and controlling, when the information processing apparatus decides in the decision step to inhibit use of the credential, to prompt the user to execute user authentication.

14. A non-transitory computer-readable storage medium storing a program for causing a computer to perform a control method of an information processing apparatus, which includes an authentication unit configured to execute processing for user authentication using one of a plurality of authentication methods and a management unit configured to manage a credential generated when the authentication unit authenticates a user, the method comprising:

a setting step of setting in the information processing apparatus setting contents which do not permit the information processing apparatus to use the credential managed by the management unit to be used to execute a function included in the information processing apparatus, wherein the setting contents are applied to a specific authentication method among the plurality of authentication methods that the authentication unit can use;

a decision step of deciding by the information processing apparatus, when the user instructs the information processing apparatus to execute the function included in the information processing apparatus and the authentication unit authenticates a user using the specific authentication method, whether or not the function is permitted to use the user credential, based on the setting contents set in the setting step; and a control step of controlling, when the information processing apparatus decides in the decision step to permit use of the credential, to execute the function using the credential, and controlling, when the information processing apparatus decides in the decision step to inhibit use of the credential, to prompt the user to execute user authentication.

15. An image processing apparatus having a single sign-on function, comprising:

a memory; and a hardware processor, the hardware processor being configured to perform the functions of an authentication unit configured to authenticate a user who logs in to said image processing apparatus;

a storage unit configured to store a user credential including authentication information used in user authentication by said authentication unit and information indicating an authentication protocol related to the user credential in association with each other;

a reading unit configured to read an image from an original;

a determination unit configured to determine, when an instruction to transmit image data of an original read by said reading unit to an external apparatus connected to be able to communicate with said image processing apparatus is received from a user, whether or not the external apparatus is accessible using the user credential, based on the user credential of the user and the information indicating the authentication, which are stored in said storage unit; and a control unit configured to prompt, when said determination unit determines that the external apparatus is not accessible using the user credential, to input an account accessible to the external apparatus, and to transmit, when said determination unit determines that the external apparatus is accessible using the user credential, the image data of the original read by said reading unit to the external apparatus, wherein when the authentication protocol is an authentication protocol which is configured to limit a security domain, said determination unit determines that the external apparatus is accessible using the user credential, and when the authentication protocol is an authentication protocol which is not configured to limit a security domain, said determination unit determines that the external apparatus is not accessible using the user credential.

* * * * *